US010569463B2

(12) United States Patent
Iwano

(10) Patent No.: US 10,569,463 B2
(45) Date of Patent: Feb. 25, 2020

(54) METHOD OF MOLDING THERMOPLASTIC RESIN MATERIAL

(71) Applicant: TOYOTA JIDOSHA KABUSHIKI KAISHA, Toyota-shi, Aichi-ken (JP)

(72) Inventor: Yoshihiro Iwano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 177 days.

(21) Appl. No.: 14/438,654

(22) PCT Filed: Sep. 2, 2014

(86) PCT No.: PCT/JP2014/073082
§ 371 (c)(1),
(2) Date: Apr. 27, 2015

(87) PCT Pub. No.: WO2015/056490
PCT Pub. Date: Apr. 23, 2015

(65) Prior Publication Data
US 2016/0214308 A1 Jul. 28, 2016

(30) Foreign Application Priority Data
Oct. 17, 2013 (JP) .................................. 2013-216643

(51) Int. Cl.
*B29C 51/08* (2006.01)
*B29C 51/30* (2006.01)
(Continued)

(52) U.S. Cl.
CPC ............ *B29C 51/30* (2013.01); *B29C 43/021* (2013.01); *B29C 43/14* (2013.01); *B29C 43/361* (2013.01);
(Continued)

(58) Field of Classification Search
CPC ........... B29L 2031/7146; B29C 51/087; B29C 43/361; B29C 43/14; B29C 2043/3634;
(Continued)

(56) References Cited

U.S. PATENT DOCUMENTS

2001/0045684 A1* 11/2001 Blanchon .............. B29C 51/087
264/163
2002/0164391 A1 11/2002 Shinma
(Continued)

FOREIGN PATENT DOCUMENTS

EP 1136239 A2 9/2001
EP 1993808 A2 11/2008
(Continued)

*Primary Examiner* — Xiao S Zhao
*Assistant Examiner* — Ninh V Le
(74) *Attorney, Agent, or Firm* — Oliff PLC

(57) ABSTRACT

A method of molding a thermoplastic resin material includes: a first molding step in which a second mold that, with a first mold, nips and presses the thermoplastic resin material and molds a product, is divided into plural sections, and one section at the divided second mold is structured so as to be able to enter into and exit from another section, and the one section is made to protrude-out with respect to the another section, and, at the one section, the thermoplastic resin material is pressed, and a portion of the product is molded; and a second molding step in which, after the first molding step, the one section is retracted into the another section, and, at the another section, the thermoplastic resin material is pressed, and a remaining portion of the product is molded.

3 Claims, 7 Drawing Sheets

(51) Int. Cl.
- B29C 43/02 (2006.01)
- B29C 43/14 (2006.01)
- B29C 43/36 (2006.01)
- B29C 51/04 (2006.01)
- B29L 31/00 (2006.01)
- B29K 105/06 (2006.01)
- B29K 101/12 (2006.01)
- B29K 105/08 (2006.01)
- B29K 105/00 (2006.01)
- B29K 307/04 (2006.01)
- B29L 31/30 (2006.01)

(52) U.S. Cl.
CPC ............ B29C 51/087 (2013.01); *B29C 51/04* (2013.01); *B29C 2043/3613* (2013.01); *B29C 2043/3631* (2013.01); *B29C 2043/3634* (2013.01); *B29K 2101/12* (2013.01); *B29K 2105/06* (2013.01); *B29K 2105/08* (2013.01); *B29K 2105/256* (2013.01); *B29K 2307/04* (2013.01); *B29L 2031/30* (2013.01); *B29L 2031/7146* (2013.01)

(58) Field of Classification Search
CPC .... B29C 2043/3613; B29C 2043/3621; B29C 51/34; B29C 51/343; B29C 43/18; B29C 51/30; B29C 43/021; B29C 43/36; B29C 2043/3631; B29C 2043/3616; B29C 70/46; B29K 2101/12
See application file for complete search history.

(56) References Cited

U.S. PATENT DOCUMENTS

| | | | |
|---|---|---|---|
| 2004/0070233 A1* | 4/2004 | Steinhauser | B60R 21/13 296/193.01 |
| 2006/0124234 A1* | 6/2006 | Hasegawa | B29C 70/30 156/272.2 |
| 2006/0220274 A1* | 10/2006 | Dooley | B29C 45/14196 264/259 |
| 2009/0072441 A1* | 3/2009 | Bracke | B31D 3/0284 264/271.1 |
| 2010/0061061 A1* | 3/2010 | Murata | H01M 2/1077 361/699 |
| 2012/0270095 A1* | 10/2012 | Kim | H01M 2/1077 429/159 |
| 2013/0082416 A1* | 4/2013 | Wakeman | B29C 33/14 264/259 |
| 2013/0313862 A1* | 11/2013 | Yamaji | B62D 25/025 296/203.01 |

FOREIGN PATENT DOCUMENTS

| | | | | |
|---|---|---|---|---|
| JP | H07256768 A | * | 10/1995 | ............ B29B 11/16 |
| JP | 2001-185568 A | | 7/2001 | |
| JP | 2011-255587 A | | 12/2011 | |
| JP | WO2012105716 A1 | * | 8/2012 | ............ B29D 23/00 |

* cited by examiner

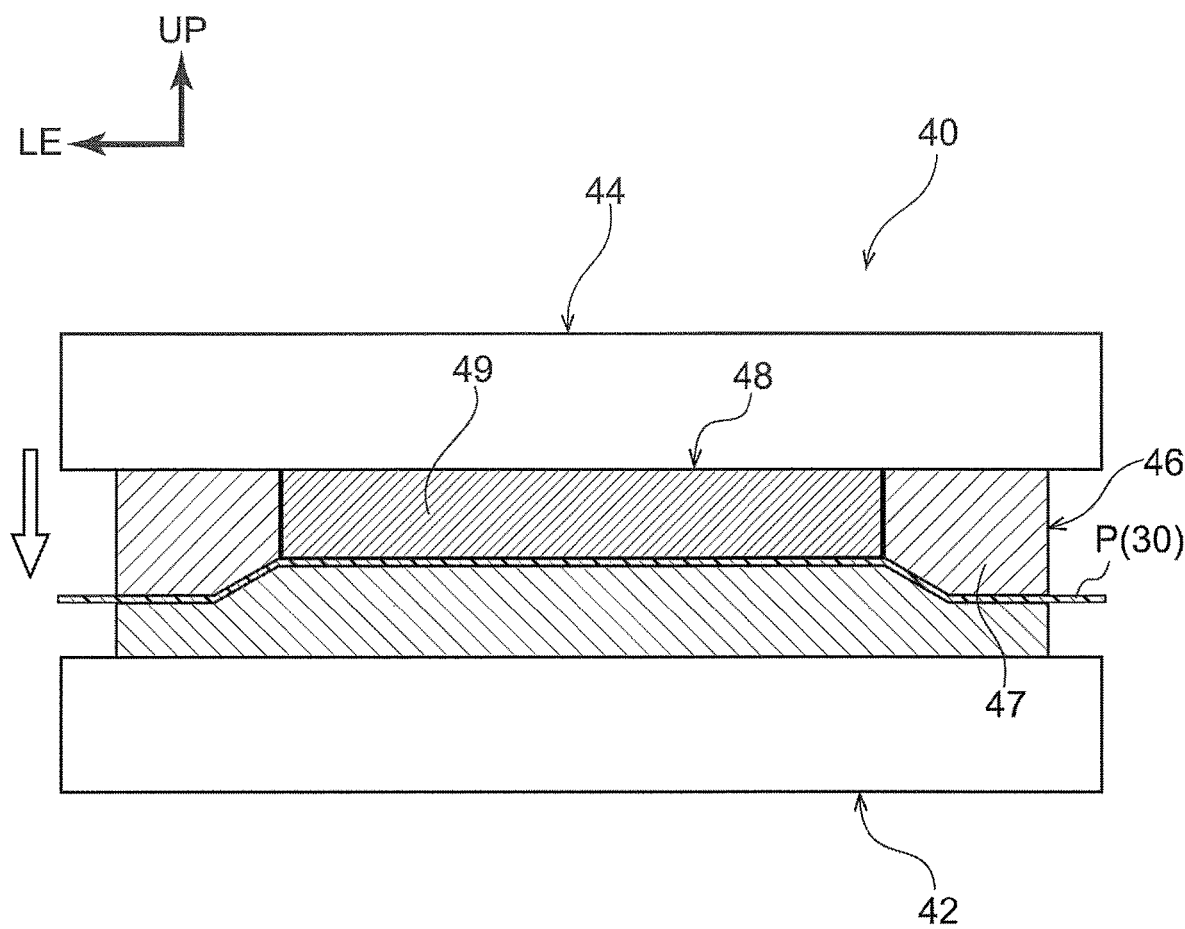

METHOD OF MOLDING THERMOPLASTIC RESIN MATERIAL

TECHNICAL FIELD

The present invention relates to a method of molding a thermoplastic resin material.

BACKGROUND ART

Methods of molding thermoplastic resin materials, at which it is difficult for product flaws such as wrinkles or twists or the like to arise in the molded product, are conventionally known (see, for example, Japanese Patent Application Laid-Open (JP-A) No. 2011-255587).

SUMMARY OF INVENTION

Technical Problem

By the way, at the time of press molding a multi-layer thermoplastic resin material into a desired shape, a high-load press machine that can apply a relatively high load is needed in order to suppress the generation of insufficiently pressed places. However, a high-load press machine is expensive, and is a cause of equipment costs increasing.

Thus, an object of the present invention is to provide a method of molding a thermoplastic resin material that can suppress the generation of the insufficiently pressed places in a product even if press molding is carried out by a low-load press machine.

Solution to Problem

In order to achieve the above-described object, in accordance with a first aspect of the present invention, there is provided a method of molding a thermoplastic resin material comprising: a first molding step in which at least one of a first mold and a second mold, that nip and press a thermoplastic resin material and are for molding a product, is divided into a plurality of sections, and one section of the at least one of the first mold and the second mold that is divided into the plurality of sections is made to protrude-out with respect to another section, and, at the one section, the thermoplastic resin material is pressed by another of the first mold and the second mold, and a portion of the product is molded; and a second molding step in which, after the first molding step, the one section is retracted into the another section, and, at the another section, the thermoplastic resin material is pressed by the another of the first mold and the second mold, and a remaining portion of the product is molded.

In the above-described aspect, by the first molding step, at one section of at least one of the first mold and the second mold, a thermoplastic resin material is pressed by the another of the first mold and the second mold, and a portion of the product is molded. After the first molding step, by the second molding step, at the another section of the at least one of the first mold and the second mold, the thermoplastic resin material is pressed by the another of the first mold and the second mold, and the remaining portion of the product is molded. Namely, the thermoplastic resin material is pressed at different times at the one section and at the another section. Accordingly, even if press molding is carried out by a low-load press machine, insufficiently pressed places arising at the product at the one section and the another section is suppressed.

Further, in accordance with a second aspect of the present invention, there is provided a method of molding a thermoplastic resin material comprising: a first molding step in which at least one of a first mold and a second mold, that nip and press a thermoplastic resin material and are for molding a product, is divided into a plurality of sections, and at one section that protrudes-out with respect to another section of the at least one of the first mold and the second mold that is divided into the plurality of sections, the thermoplastic resin material is pressed by another of the first mold and the second mold, and a thin plate portion of the product is molded; and a second molding step in which, after the first molding step, at the another section, the thermoplastic resin material is pressed by the another of the first mold and the second mold, and a thick plate portion, that is thicker than the thin plate portion, of the product is molded.

In the above-described aspect, by the first molding step, at one section of at least one of the first mold and the second mold, a thermoplastic resin material is pressed by the another of the first mold and the second mold, and a thin plate portion of the product is molded. After the first molding step, by the second molding step, at the another section of the at least one of the first mold and the second mold, the thermoplastic resin material is pressed by the another of the first mold and the second mold, and a thick plate portion of the product is molded. Namely, the timing of molding at the one section and the timing of molding at the another section are offset, and the thermoplastic resin material is pressed at different times at the one section and at the another section. Accordingly, even if press molding is carried out by a low-load press machine, insufficiently pressed places arising at the product at the one section and the another section is suppressed. Note that the thin plate portion is, after being molded in the first step, pressed again in the second step, and therefore, the plate thickness thereof is thin as compared with the thick plate portion.

Further, in a third aspect of the present invention, there is provided a method of molding a thermoplastic resin material in which, in the first aspect or the second aspect of the present invention, the product is a panel that structures a battery frame that supports a battery of an automobile.

In accordance with the above-described aspect, even if press molding is carried out by a low-load press machine, insufficiently pressed places arising at a panel that structures a battery frame is suppressed.

Further, in a fourth aspect of the present invention, there is provided a method of molding a thermoplastic resin material in which, in any one of the first through third aspects of the present invention, the thermoplastic resin material is a carbon fiber reinforced resin material.

In accordance with the above-described aspect, even if a carbon fiber reinforced resin material is press molded by a low-load press machine, insufficiently pressed places arising at the product is suppressed.

Advantageous Effects of Invention

As described above, in accordance with the first aspect of the present invention, even if press molding is carried out by a low-load press machine, insufficiently pressed places arising at the product at the one section and the another section can be suppressed.

In accordance with the second aspect of the present invention, even if press molding is carried out by a low-load press machine, insufficiently pressed places arising at the product at the one section and the another section can be suppressed.

In accordance with the third aspect of the present invention, even if press molding is carried out by a low-load press machine, insufficiently pressed places arising at a panel that structures a battery frame can be suppressed.

In accordance with the fourth aspect of the present invention, even if press molding is carried out by a low-load press machine, insufficiently pressed places arising at a product that is formed from a carbon fiber reinforced resin material is suppressed.

BRIEF DESCRIPTION OF THE DRAWINGS

FIG. 6 is a front view showing a second molding step by the mold relating to the first embodiment that molds the core panel.

DESCRIPTION OF EMBODIMENTS

Figure 1:
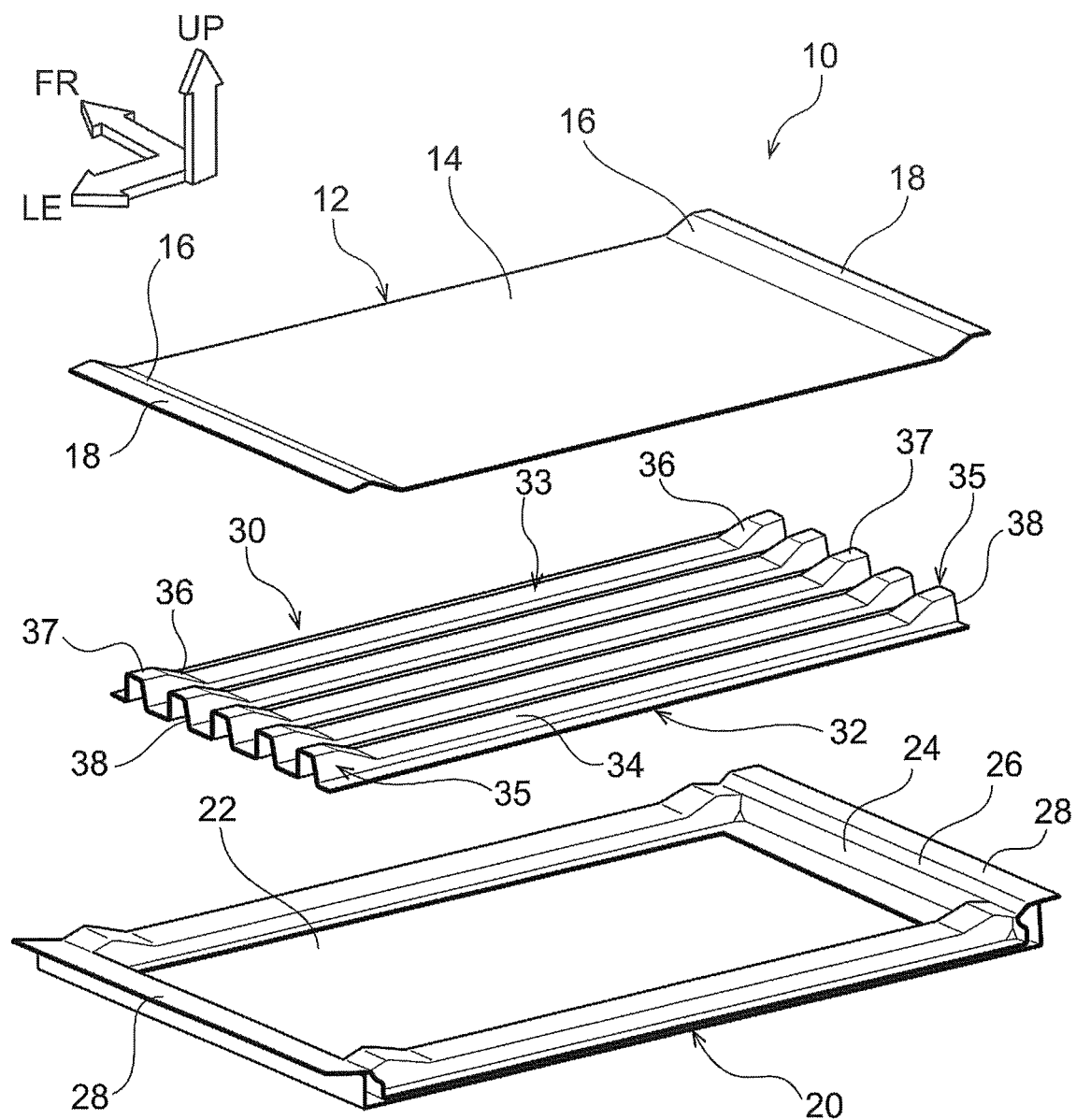
FIG. 1 is an exploded perspective view of a battery frame that has a core panel.

Embodiments relating to the present invention are described in detail hereinafter on the basis of the drawings. Note that, for convenience of description, arrow UP shown appropriately in FIG. 1 is the vehicle body upward direction, arrow FR is the vehicle body frontward direction, and arrow LE is the vehicle body leftward direction (the vehicle transverse direction left side). Further, arrow UP that is shown appropriately in the respective drawings other than FIG. 1 is the upward direction of a mold, arrow FR is the frontward direction of the mold, and arrow LE is the leftward direction of the mold.

A battery frame (stack frame) 10, that is for supporting a fuel cell stack (not illustrated) from the vehicle body lower side, is disposed at the vehicle body lower side of a floor panel (not illustrated) at a vehicle such as an electric automobile or the like. As shown in FIG. 1, the battery frame 10 is structured to include an upper panel 12, a lower panel 20, and a core panel 30 that serves as a reinforcing member and is provided between the upper panel 12 and the lower panel 20.

The upper panel 12 has a top portion 14 that is rectangular flat plate shaped, inclined portions 16 that are rectangular flat plate shaped and are integrally provided continuously with the vehicle transverse direction both end portions of the top portion 14 obliquely upward toward the vehicle transverse direction outer sides so as to run along inclined walls 36 that are described later, and flange portions 18 that are rectangular flat plate shaped and are integrally provided continuously with the vehicle transverse direction both end portions of the inclined portions 16 substantially horizontally toward the vehicle transverse direction outer sides so as to run along top walls 37 that are described later.

The lower panel 20 has a bottom portion 22 that is rectangular flat plate shaped, side wall portions 24 that are rectangular plate shaped and that are integrally provided continuously with the vehicle transverse direction both end portions of the bottom portion 22 substantially orthogonally toward the vehicle body upper side, inclined portions 26 that are rectangular flat plate shaped and are integrally provided continuously with the upper end portions of the side wall portions 24 obliquely upward toward the vehicle transverse direction outer sides, and flange portions 28 that are rectangular flat plate shaped and are integrally provided continuously with the vehicle transverse direction both end portions of the inclined portions 26 substantially horizontally toward the vehicle transverse direction outer sides.

The core panel 30 has a main body portion 32 at which convex portions 33, that are substantially hat-shaped in cross-section and extend along the vehicle transverse direction, are formed so as to be lined-up in plural rows (e.g., five rows) in the vehicle body longitudinal direction, and projecting portions 35 that are formed at the vehicle transverse direction both end portions of the main body portion 32 so as to be continuous from top walls 34 of the convex portions 33 and project toward the vehicle body upper side.

The vehicle transverse direction inner sides of the projecting portions 35 are made to be the inclined walls 36 that are continuous from the top walls 34 of the convex portions 33 and extend upwardly toward the vehicle transverse direction outer sides. The top walls 37, that extend substantially horizontally toward the vehicle transverse direction outer sides, are integrally provided continuously with the upper end portions of the inclined wall portions 36. Further, the vehicle transverse direction outer side end portions of the projecting portions 35 are made to be end surface portions 38 that are cross-sections that are substantially orthogonal to the main body portion 32. Namely, the projecting portions 35 are formed in substantially trapezoidal shapes in a front view seen from the vehicle body longitudinal direction.

Further, the bottom surfaces of the top portion 14, the inclined portions 16, and the flange portions 18 of the upper panel 12 are respectively joined by an adhesive to the top surfaces of the respective convex portions 33 (the respective top walls 34), the respective inclined walls 36, and the respective top walls 37 of the core panel 30. The top surface of the bottom portion 22 of the lower panel 20 is joined by an adhesive to the bottom surface of the main body portion 32 of the core panel 30, and the end surface portions 38 are made to abut the side wall portions 24. Due thereto, the battery frame 10 that has a rectangular closed cross-sectional structure is mostly structured.

Further, the upper panel 12, the lower panel 20 and the core panel 30 that structure the battery frame 10 are respectively molded of a thermoplastic resin material that is strengthened by, for example, carbon fibers being mixed therein (a carbon fiber reinforced resin material: CRFP). In other words, the upper panel 12, the lower panel 20 and the core panel 30 are manufactured by sheet materials P (see FIG. 5) of uniform plate thicknesses, that are formed of a thermoplastic resin material (CRFP) and in rectangular flat plate shapes, being press molded. Thus, a mold 40 for press molding is described next by using the core panel 30 as an example.

<First Embodiment>

Figure 2:
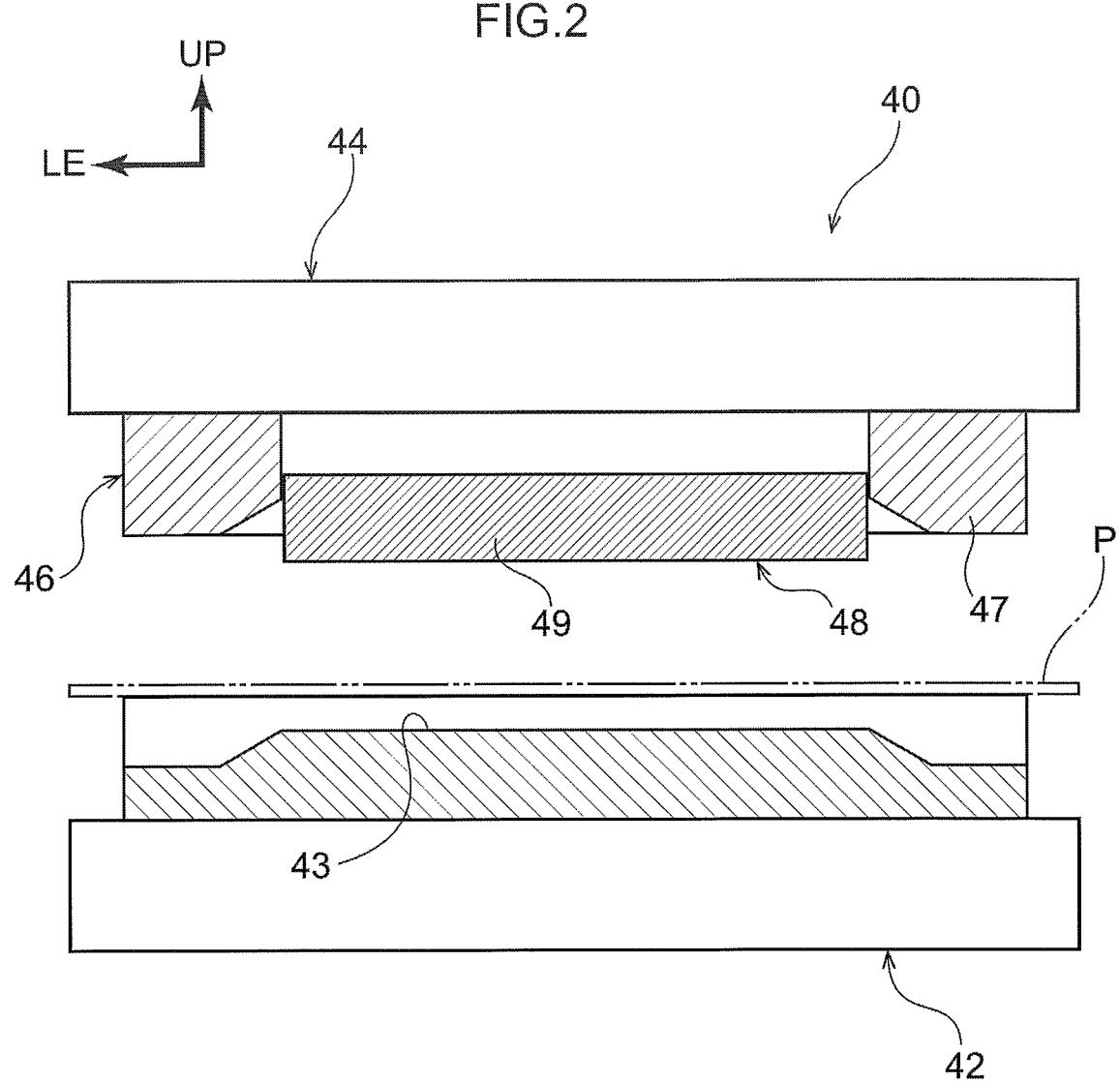
FIG. 2 is a front view showing a mold relating to a first embodiment that molds the core panel.
Figure 3:
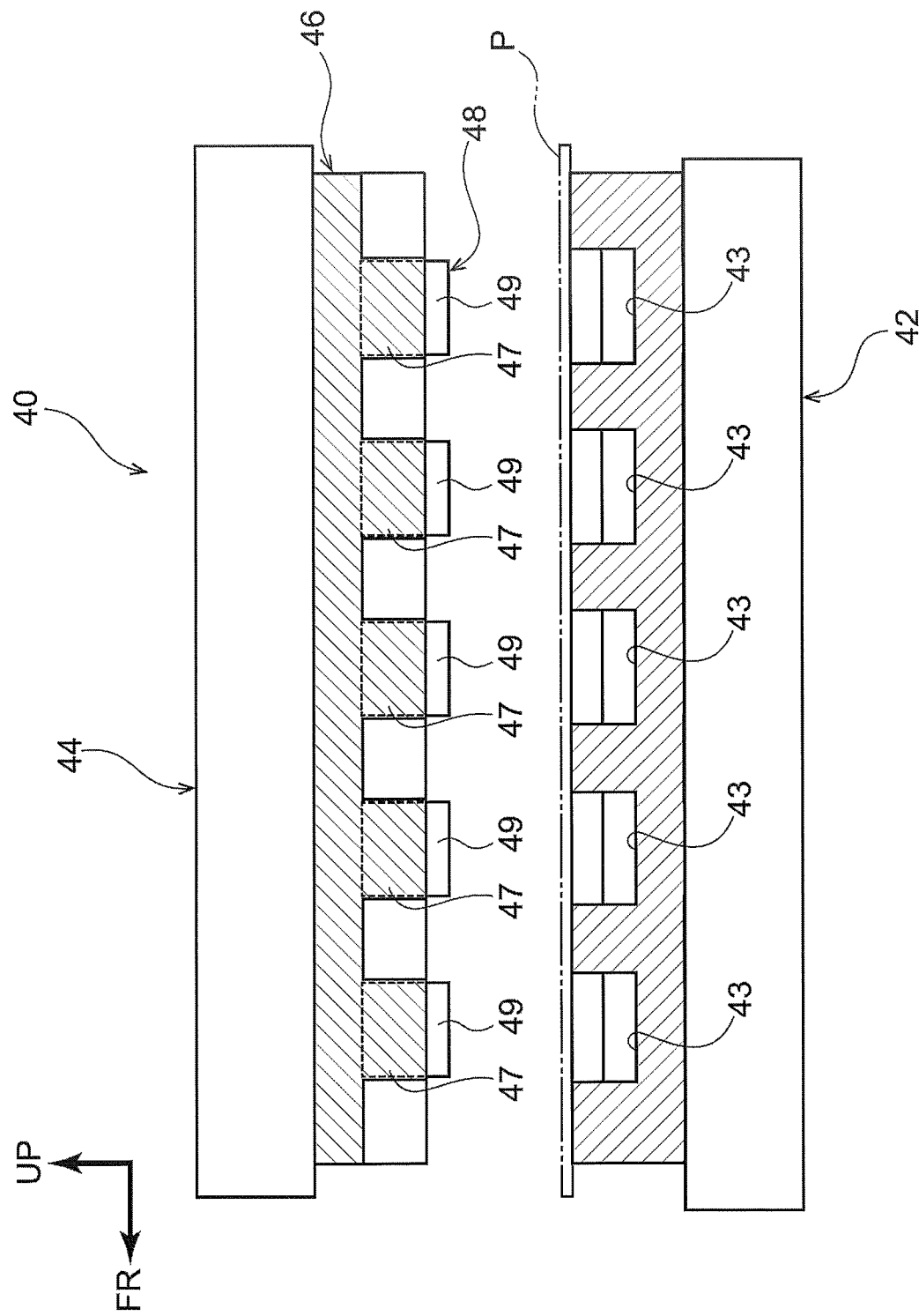
FIG. 3 is a side view showing the mold relating to the first embodiment that molds the core panel.

A first embodiment is described first. As shown in FIG. 2 and FIG. 3, the mold 40 that molds the core panel 30 has a lower mold 42 that serves as a first mold that is the fixed side, and an upper mold 44 that serves as a second mold that is the movable side. Further, the central portion of the upper mold 44 is made to be an inner mold 48 that is separated (divided) from an outer mold 46, that is the peripheral edge portion of the upper mold 44, and that serves as one section that is structured so as to be able to enter into and exit from the outer mold 46 (move in the vertical direction).

Figure 4:
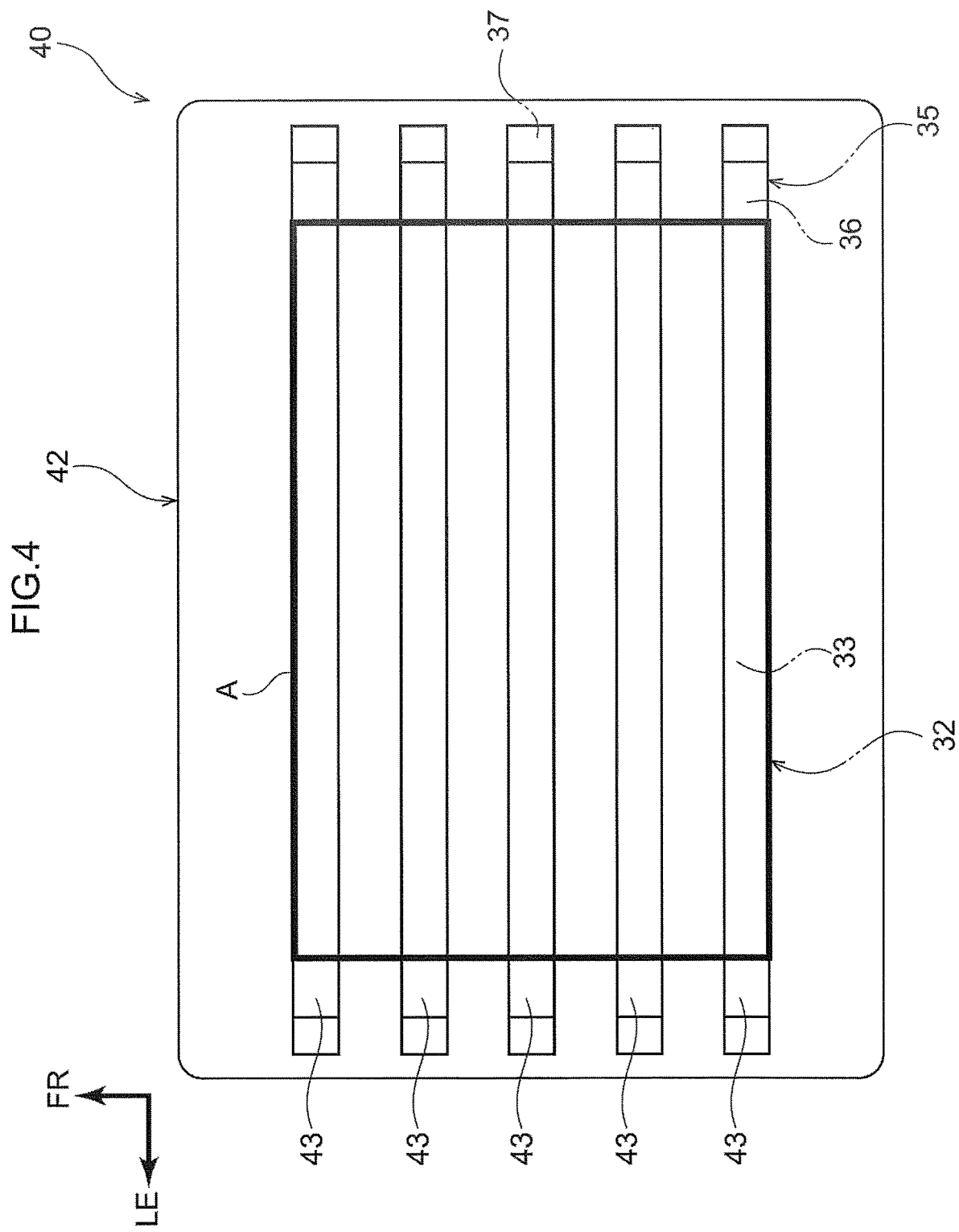
FIG. 4 is a plan view of a lower mold relating to the first embodiment that molds the core panel.

As shown in FIG. 4, region A that is molded at the inner mold 48 is the main body portion 32, i.e., the respective convex portions 33, that is further toward the inner side than the respective projecting portions 35 (the respective inclined walls 36) of the core panel 30. Further, the region that is molded at the outer mold 46 and serves as another section is the respective projecting portions 35 that include the inclined walls 36 and the top walls 37 of the core panel 30. The end surface portions 38 of the core panel 30 are formed due to the vehicle transverse direction outer side end portions of the respective top walls 37 being cut after molding.

Further, in order to mold the respective convex portions 33 and the respective projecting portions 35 (the respective inclined walls 36 and the respective top walls 37) of the core panel 30, concave portions 43 of plural rows (e.g., 5 rows) are formed at the lower mold 42, and convex portions 47, 49 of plural rows (e.g., 5 rows) are formed at the upper mold 44 (the outer mold 46 and the inner mold 48). Further, it suffices to use a known raising and lowering structure (not illustrated), such as raising and lowering by providing a ball screw or the like, as the structure that causes the inner mold 48 to be able to enter into and exit from the outer mold 46.

A method of molding the core panel 30 (thermoplastic resin material) at the mold 40, that relates to the first embodiment and has the above-described structure, is described next.

Figure 5:
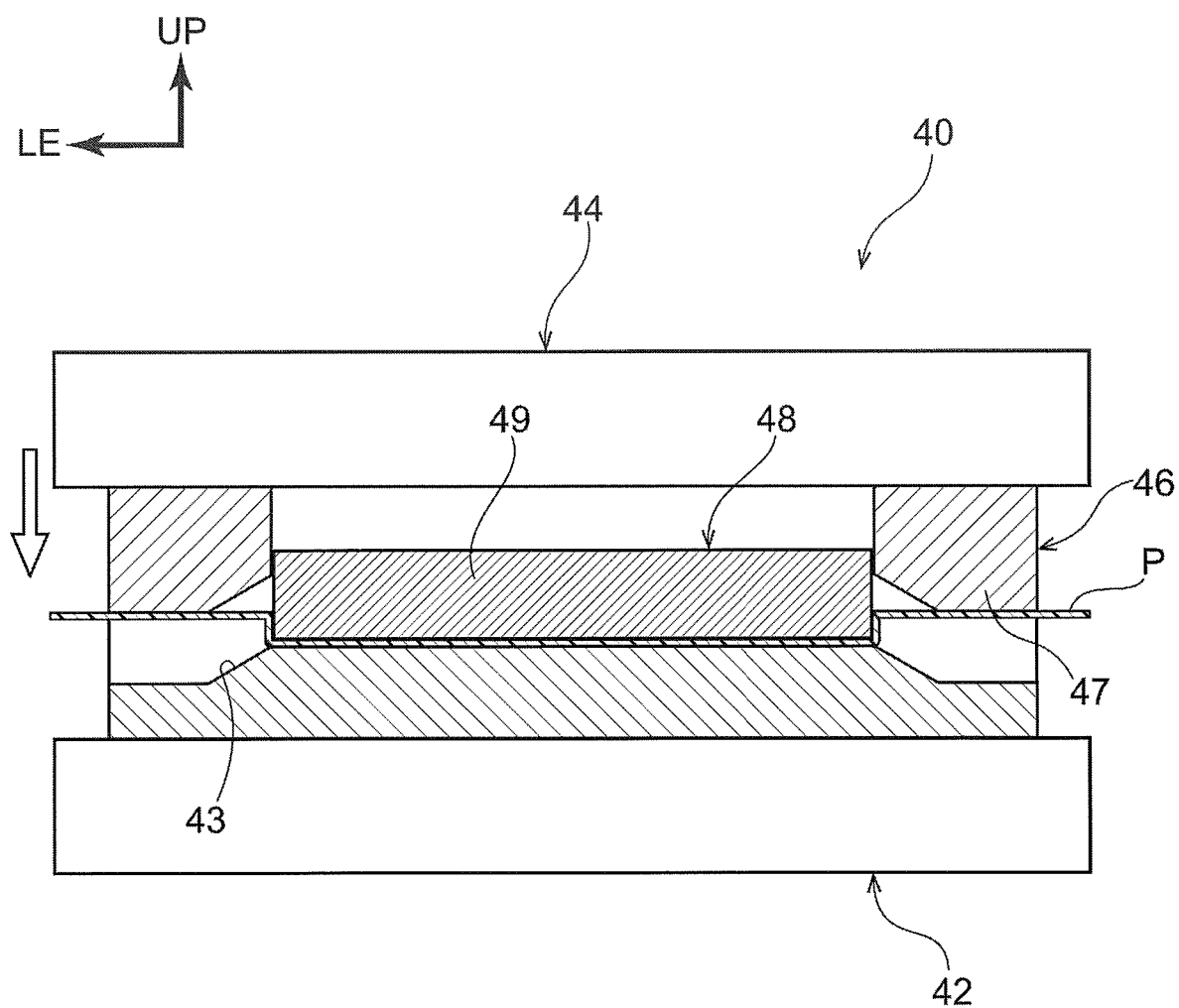
FIG. 5 is a front view showing a first molding step by the mold relating to the first embodiment that molds the core panel.

First, as shown in FIG. 2 and FIG. 3, the inner mold 48 is lowered (is made to protrude-out downward) with respect to the outer mold 46, and the sheet material P, that is rectangular flat plate shaped and serves as a thermoplastic resin material, is placed on the top surface of the lower mold 42. Then, as shown in FIG. 5, in the state in which the inner mold 48 protrudes-out further downward than the outer mold 46, the upper mold 44 is lowered so as to be made to approach the lower mold 42.

Due thereto, the central portion (a portion) of the sheet material P that is supported at the lower mold 42 is pressurized from above by the inner mold 48 (the central portion of the sheet material P that is supported at the lower mold 42 is nipped and pressed by the concave portions 43 of the lower mold 42 and the convex portions 49 of the inner mold 48), and the respective convex portions 33 of the core panel 30 are press molded (first molding step).

Next, as shown in FIG. 6, the inner mold 48 is raised (retracted upwardly) with respect to the outer mold 46, and the upper mold 44 is lowered again. Due thereto, the peripheral edge portion (the remaining portion) of the sheet material P that is supported at the lower mold 42 is pressurized from above by the outer mold 46 (the peripheral edge portion of the sheet material P that is supported at the lower mold 42 is nipped and pressed by the concave portions 43 of this lower mold 42 and the convex portions 47 of the outer mold 46), and the respective projecting portions 35, that include the inclined walls 36 and the top walls 37, of the core panel 30 are press molded (second molding step).

In this way, when there is a structure in which the sheet material P, that has a uniform plate thickness and is supported at the lower mold 42, is pressurized over two stages (at different times) by the inner mold 48 and the outer mold 46 of the upper mold 44, the force of pressurization by the upper mold 44 is divided into that at the time of pressurizing by using the inner mold 48 and that at the time of pressurizing by using the outer mold 46. Therefore, this pressurization force is reduced as compared with a structure in which pressurization is carried out in one stage by the upper mold 44 and the lower mold 42.

Accordingly, even if the press machine that applies the pressurization force to the upper mold 44 is an inexpensive low-load press machine (not illustrated), the core panel 30 that serves as a product can be molded. Namely, insufficiently pressed places arising at the core panel 30, that has been press molded by a low-load press machine, can be suppressed or prevented. Note that the top and bottom of the core panel 30 shown in FIG. 5 and FIG. 6 and the core panel 30 shown in FIG. 1 are reversed.

Further, the divided position of the upper mold 44 is not limited to the central portion and the peripheral edge portion, and it suffices for the upper mold 44 to be divided such that the region (surface) that is hard to mold can be molded earlier. Namely, in the case of the core panel 30, the respective convex portions 33 are a region that is difficult to mold. Therefore, the upper mold 44 is divided into the inner mold 48 of the central portion and the outer mold 46 of the peripheral edge portion, and the inner mold 48 is made to protrude-out downward (toward the lower mold 42 side) such that the respective convex portions 33 are molded before the respective projecting portions 35.

Further, when carrying out molding by such a two-stage pressurization type molding method, a difference in temperature arises at the sheet material P at the time of molding between the respective convex portions 33 that are molded earlier and the respective projecting portions 35 that are molded after. Therefore, thin lines that do not affect the product are formed at the border portions of the respective convex portions 33 and the respective projecting portions 35 at the core panel 30. Whether or not a product is the core panel 30 that has been molded in accordance with the first embodiment can be discriminated by checking the existence of such lines.

<Second Embodiment>

A second embodiment is described next. Note that regions that are equivalent to the above-described first embodiment are denoted by the same reference numerals, and detailed description thereof (included common operation) is omitted as appropriate.

Figure 7A:
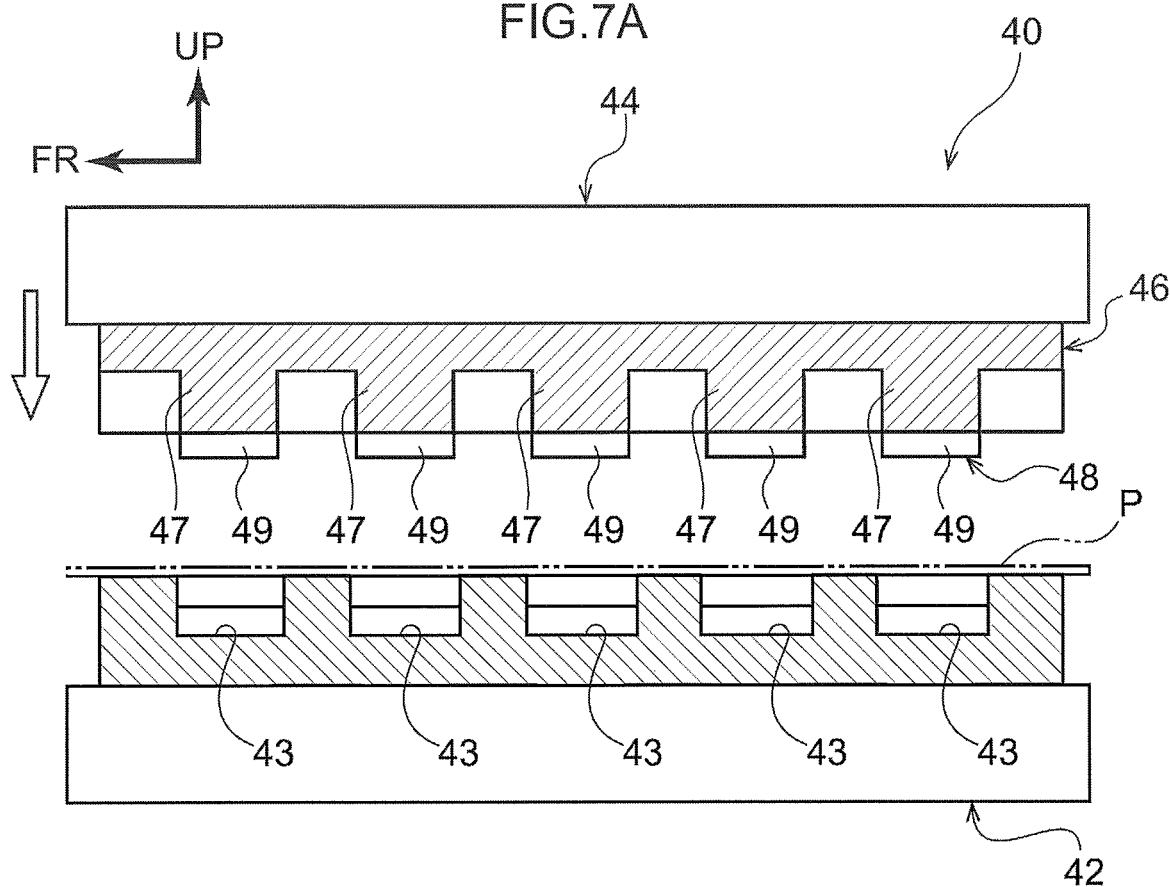
FIG. 7A is a side view showing a mold relating to a second embodiment that molds the core panel.

As shown in FIG. 7A, the mold 40 that molds the core panel 30 has the lower mold 42 that serves as the first mold that is the fixed side, and the upper mold 44 that serves as the second mold that is the movable side. Further, the central portion of the upper mold 44 relating to this second embodiment is made to be the inner mold 48 that serves as one section and that is formed so as to protrude-out further downward than the outer mold 46 that is the peripheral edge portion of the upper mold 44.

Note that, in the same way as the first embodiment, the region A that is molded at the inner mold 48 is the main body portion 32, i.e., the respective convex portions 33, that is further toward the inner side than the respective projecting portions 35 (the respective inclined walls 36) of the core panel 30. Further, the region that is molded at the outer mold 46 and serves as another section is the respective projecting portions 35 that include the inclined walls 36 and the top walls 37 of the core panel 30.

Further, in order to mold the respective convex portions 33 and the respective projecting portions 35 (the respective inclined walls 36 and the respective top walls 37) of the core panel 30, the concave portions 43 of plural rows (e.g., 5 rows) are formed at the lower mold 42, and the convex portions 47, 49 of plural rows (e.g., 5 rows) are formed at the upper mold 44 (the outer mold 46 and the inner mold 48).

A method of molding the core panel 30 (thermoplastic resin material) at the mold 40, that relates to the second embodiment and has the above-described structure, is described next.

First, as shown in FIG. 7A, the sheet material P, that is rectangular flat plate shaped and serves as a thermoplastic resin material, is placed on the top surface of the lower mold 42. Then, the upper mold 44, at which the inner mold 48 protrudes-out further downward than the outer mold 46, is lowered so as to be made to approach the lower mold 42.

Due thereto, the central portion (a portion) of the sheet material P that is supported at the lower mold 42 is pressurized from above by the inner mold 48 (the central portion of the sheet material P that is supported at the lower mold 42 is nipped and pressed by the concave portions 43 of the lower mold 42 and the convex portions 49 of the inner mold 48), and the respective convex portions 33 of the core panel 30 are press molded (first molding step).

Next, the peripheral edge portion (the remaining portion) of the sheet material P that is supported at the lower mold 42 is pressurized from above by the outer mold 46 (the peripheral edge portion of the sheet material P that is supported at the lower mold 42 is nipped and pressed by the concave portions 43 of this lower mold 42 and the convex portions 47 of the outer mold 46), and the respective projecting portions 35, that include the inclined walls 36 and the top walls 37, of the core panel 30 are press molded (second molding step).

Figure 7B:
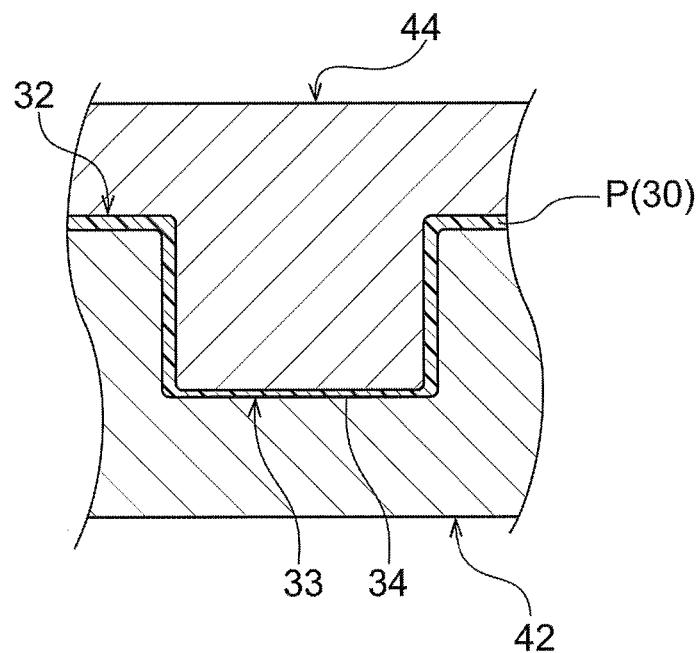
FIG. 7B is a cross-sectional view showing the mold relating to the second embodiment that molds the core panel.

Here, as shown in FIG. 7B, the top walls 34 at the respective convex portions 33 of the core panel 30 are formed as thin plate portions whose plate thickness is thinner than the other regions (e.g., the main body portion 32 except for the convex portions 33). Accordingly, at the time of press molding the sheet material P that has a uniform plate thickness and is supported at the lower mold 42, at the upper mold 44, as described above, the timing of molding at the inner mold 48 and the timing of molding at the outer mold 46 can be offset.

In this way, when there is a structure in which the sheet material P, that has a uniform plate thickness and is supported at the lower mold 42, is pressurized over two stages (at different times) by the inner mold 48 and the outer mold 46 of the upper mold 44, the force of pressurization by the upper mold 44 is divided into that at the time of pressurizing by the inner mold 48 and that at the time of pressurizing by the outer mold 46. Therefore, this pressurization force is reduced as compared with a structure in which pressurization is carried out in one stage by the upper mold 44 and the lower mold 42 (the top walls 34 of the convex portions 33 are molded into the same thick plate portion as the main body portion 32 except for the convex portions 33).

Accordingly, even if the press machine that applies the pressurization force to the upper mold 44 is an inexpensive low-load press machine, the core panel 30 that serves as a product can be molded. Namely, insufficiently pressed places arising at the core panel 30, that has been press molded by a low-load press machine, can be suppressed or prevented.

Further, when carrying out molding by such a two-stage pressurization type molding method, the top walls 34 of the respective convex portions 33 that are regions that are difficult to mold are formed as thin plate portions whose plate thickness is thinner than the main body portion 32 except for the respective convex portions 33. Therefore, whether or not a product is the core panel 30 that has been molded in accordance with the second embodiment can be discriminated by comparing the plate thickness of the top walls 34 at the convex portions 33 of the core panel 30 that is the product, and the plate thickness of the main body portion 32 except for the convex portions 33.

Methods of molding a thermoplastic resin material relating to the present embodiments have been described above on the basis of the drawings, but the methods of molding a thermoplastic resin material relating to the present embodiments are not limited to the illustrated methods, and the designs thereof can be changed appropriately within a scope that does not depart from the gist of the present invention. For example, the product that is molded by the methods of molding a thermoplastic resin material relating to the present embodiments is not limited to the core panel 30 of the battery frame 10.

Further, although the upper mold 44 is divided in two into the inner mold 48 and the outer mold 46, the number of divisions is not limited to two, and may be set appropriately in accordance with the regions that are difficult to mold at the product. Further, although the upper mold 44 is divided into plural molds (the inner mold 48 and the outer mold 46), the lower mold 42 may be divided into plural molds (the inner mold 48 and the outer mold 46). Moreover, both of the upper mold 44 and the lower mold 42 may respectively be divided into plural molds. However, in this case, the section that enters/exits or is protruded-out at the upper mold 44, and the section that enters/exits or is protruded-out at the lower mold 42, do not overlap as seen in plan view.

Further, in the method of molding a thermoplastic resin material relating to the second embodiment, molding can be carried out only for products having a thin plate portion and a thick plate portion that is thicker than the thin plate portion. However, the method of molding a thermoplastic resin material relating to the first embodiment has the advantage that molding can be carried out regardless of the plate thickness of the product.

The invention claimed is:

1. A method of molding a thermoplastic resin sheet, the method comprising:
   a first molding step in which at least one of a first mold and a second mold, that nip and press a thermoplastic resin sheet and are for molding a product, is divided into a plurality of sections, and one section of the at least one of the first mold and the second mold that is divided into the plurality of sections is made to protrude-out by moving the one section with respect to another section of the plurality of sections, the thermoplastic resin sheet is suspended from an uppermost surface of the first mold or the second mold, and a portion of the thermoplastic resin sheet is pressed into a concave shape by moving the one section which protrudes out with respect to the uppermost surface of the first mold or the second mold while the thermoplastic resin sheet is supported on the uppermost surface; and
   a second molding step in which, after the first molding step, the one section is retracted entirely into the another section so that the another section protrudes out with respect to the plurality of sections, and another portion of the thermoplastic resin sheet, while the thermoplastic resin sheet is supported on the uppermost surface, is pressed by the at least one of the first mold and the second mold into a concave shape having a depth with respect to the uppermost surface that is greater than a depth of the concave shape formed in the first molding step, wherein the concave shape formed in the second molding step is formed directly adjacent to a lowermost surface of the concave shape formed in the first molding step so that the lowermost surface of the concave shape formed in the first molding step forms an uppermost surface of a convex shape with respect to a lowermost surface of the concave shape formed in the second molding step.

2. The method of molding a thermoplastic resin sheet of claim 1, wherein the product is a panel that structures a battery frame that supports a battery of an automobile.

3. The method of molding a thermoplastic resin sheet of claim 1, wherein the thermoplastic resin sheet is a carbon fiber reinforced resin sheet.

\* \* \* \* \*